J. SHERMAN.
GRATE BAR.

No. 65,289.  Patented May 28, 1867.

Witnesses;

Inventor;
Joseph Sherman

United States Patent Office.

JOSEPH SHERMAN, OF BURLINGTON, NEW JERSEY.

Letters Patent No. 65,289, dated May 28, 1867.

IMPROVEMENT IN GRATE-BAR.

*The Schedule referred to in these Letters Patent and making part of the same.*

TO ALL WHOM IT MAY CONCERN:

Be it known that I, JOSEPH SHERMAN, of Burlington, in the county of Burlington, and State of New Jersey, have invented a new and useful Improvement in Grate-Bars; and I do hereby declare that the following is a full, clear, and exact description of the same, reference being had to the annexed drawings, making part of this specification, in which—

The same letters are employed in all the figures in the indication of identical parts.

The object of this improvement is to provide a more equal distribution of the draught over the surface of the burning fuel, and to protect the furnace-walls from the action of the fire.

Figure 1:
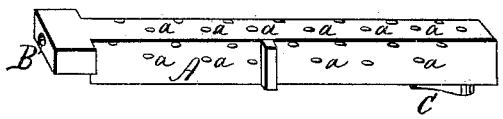
Figure 1 is a perspective view of a horizontal grate-bar.
Figure 2:
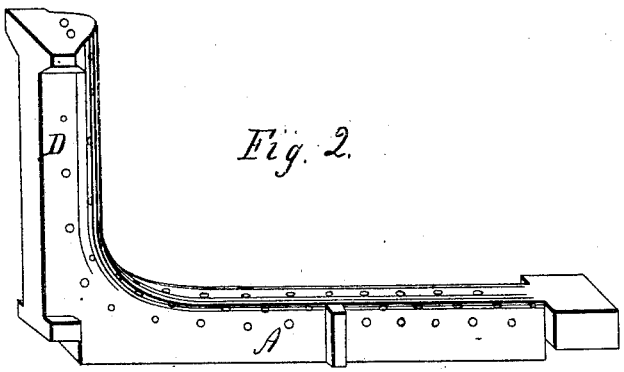
Figure 2 is a perspective view of a horizontal grate-bar with a vertical extension.
Figure 3:
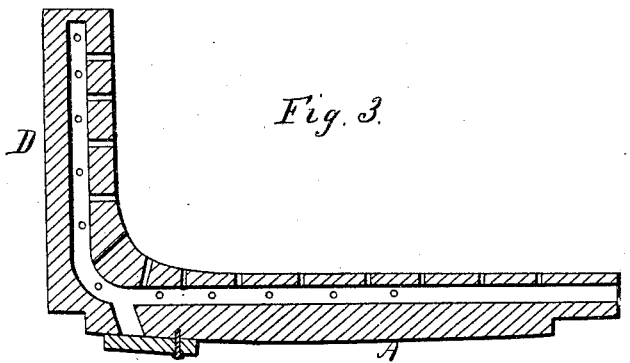
Figure 3 is a vertical longitudinal section of the same.

The horizontal grate-bar A is constructed as a tube, permitting a free circulation of air through the grate-bar, entering at the end at B, and passing out through a series of small openings, $a\ a\ a$, in each side of the bar, and also on the upper side, or the side next the fire. The jets of air passing out of the orifices $a\ a$ are mingled immediately with the gaseous products of combustion, facilitating their inflammation, and at the same time the circulation of cold currents of air through the tubular grate-bars tends to keep down their temperature and preserve them from the destructive action of the fire. To permit the removal of ashes and other fine substances falling into the tube through the orifices $a\ a$, an opening, C, is made at the back end of the grate-bar through its lower surface, or through the end from which such accumulations may be expelled by the introduction of a rod through the opening B. The grate-bar described is a horizontal grate-bar. I prefer, however, to construct them with a curved exterior, and in one piece, the whole bar in this case being constructed as already described as to the internal tube and orifices. This form of construction is shown at D, in figs. 2 and 3, and is valuable for the protection of the furnace-walls from the action of the intense heat of the fires, and also in producing a more perfect circulation of atmospheric air through the burning fuel.

What I claim as my invention, and desire to secure by Letters Patent, is—

1. The horizontal tubular grate-bars A, open at B, and constructed with small orifices $a\ a$, for the escape of the air on the three sides nearest the fire, and also with an opening, C, at or near the rear end, substantially as and for the purpose set forth.

2. Ventilated grate-bars, constructed with a vertical tubular and perforated extension, D, of the horizontal tubular portion of the bars A, substantially as described.

In testimony whereof I have signed my name to this specification in the presence of two subscribing witnesses.

JOSEPH SHERMAN.

Witnesses:
R. MASON,
JOHN S. HOLLINGSHEAD.